Patented Sept. 12, 1944

2,357,988

UNITED STATES PATENT OFFICE 2,357,988

VANADIUM RECOVERY FROM CHROMATES

Alfred E. Van Wirt and Andrew G. Aylies, Glens Falls, N. Y., assignors to Imperial Paper and Color Corporation, Glens Falls, N. Y., a corporation of New York No Drawing. Application January 19, 1942, Serial No. 427,294

7 Claims. (Cl. 23—18)

This invention relates to the production of alkali-metal chromates, more particularly to the production of alkali-metal chromates from chromite ore containing appreciable quantities of vanadium, and has for its object the provision of an improved method of treating such ore. Vanadium in chromite ores used for the production of alkali-metal chromate has been a very troublesome impurity. The invention aims to provide an improved method of producing alkali-metal chromate, particularly the bichromate, in which a substantial part of the vanadium is removed in a commercially useful form, converting an otherwise useless and harmful impurity into a valuable by-product.

Typical of the chromite ores containing vanadium for producing alkali-metal chromates are those from South Africa which have in the neighborhood of from 0.2 to 0.3 per cent of vanadium. The alkali-metal chromates are usually made by a roasting or calcining the chromite ore with an alkali agent such as sodium carbonate (soda ash) in the presence of excess air. The calcined product is leached with water to extract the soluble alkali-metal chromate and the solution may be used for the recovery of chromate or be converted into alkali-metal bichromate.

The vanadium in the ore acts similarly to the chromium in that it oxidizes at high temperatures in the presence of soda ash and excess oxygen to form sodium vanadate, which is soluble in water and enters the solution in the leaching operation along with the alkali-metal chromate. In certain calcining operations lime is used as an alkali or anti-fusion material and we have found that the calcium reduces the solubility of the vanadium, preventing it from entering the solution resulting from the aqueous extraction of the chromate. This invention is directed to a method of producing alkali-metal chromates in which the calcining operation is carried out without added lime or equivalent heavy metals which will prevent or inhibit the solution of the vanadate in the leaching solution.

In accordance with the improved method of the invention, the chromite ore containing vanadium is calcined with soda ash converting substantial portions of the chromium to sodium chromate and the vanadium to sodium vanadate, compounds which are highly soluble in water and the resulting fused product is leached with water to dissolve the soluble sodium chromate and sodium vanadate. In the method of this invention the vanadium may be precipitated without accompanying objectionable materials by a suitable acidification of the aqueous solution. The solution may, advantageously, be acidified by the progressive addition of acid to effect first the precipitation of any alumina or silica contained in the solution, and then the precipitation of the vanadium.

As a result of our investigations, we have found that the vanadium may be separated from a chromate solution as a precipitate which is valuable as a commercial product. We have found that the vanadium may be precipitated in oxidic form apparently as vanadium pentoxide ($V_2O_5$) under carefully controlled conditions of acidity coupled with a suitable ageing to effect coagulation and the separation of the vanadium oxide from the solution. The precipitate usually contains some soda along with the oxidic vanadium indicating that the vanadium may be in the form of a complex involving the soda. For convenience we shall refer herein to the precipitate as "vanadium pentoxide."

The aqueous solution from the leaching operation may be treated to convert chromate to bichromate and the bichromate removed by crystallization without precipitating the vanadium. We have found that the sodium vanadate is concentrated largely in the liquor and does not tend to enter the bichromate crystals. We, accordingly, are able by the method of the invention not only to recover the vanadium but to produce a relatively pure grade of sodium bichromate from ore containing vanadium.

In accordance with a preferred application of the invention, the aqueous solution from the leaching of the roasted ore is acidified with sulfuric acid to precipitate the alumina and silica which are removed. A further addition of acid is made to convert the alkali chromate into the bichromate with the resulting formation of sodium sulfate. While it is possible to precipitate and remove the vanadium from the solution at almost any stage after the leaching of the soluble chromate, we prefer to convert the chromate to the bichromate with sulfuric acid and to precipitate and remove the sodium sulfate before proceeding with vanadium recovery. The solution is preferably evaporated to crystallize the sodium sulfate which is removed by centrifuging and filtering. The concentrated and filtered solution having a specific gravity of about 1.7 (containing about 70% $Na_2Cr_2O_7.2H_2O$) is sufficiently free of sodium sulfate for commercial purposes. All of the chromium and the vanadium which was leached out of the calcined product is still in solution. The vanadium may be recovered from this solution by suitable acidification, settling and filtering, or the solution may be further evaporated to crystallize out a large part of the bichromate, and then the vanadium is recovered from the mother liquor by subsequently acidification, settling and filtering.

In carrying out a method of the invention, a chromite ore, for example, ore from South Africa, containing from 0.2 to 0.3 per cent of vanadium is calcined or roasted with soda ash in the presence of an excess of oxygen in accordance with practices well known in the industry to convert the chromium into alkali-metal chromate soluble in water. The roasting operation is conducted without the addition of lime or equivalent heavy metal in quantities having the capacity of preventing the vanadium from being solubilized or retained in a form in which it dissolves in the leaching solution along with the chromate. The fused product from the roasting operation is leached in water or in mother liquor from a previous treatment to dissolve the sodium chromate and sodium vanadate. The ore contains alumina and silica, oxides which are to some extent at least converted to soluble sodium compounds and which are also dissolved in the aqueous extract from the roasting operation. The liquor from the leaching operation containing the chromate, vanadate and soluble compounds of alumina and silica is filtered and the filtrate is acidified with sulfuric acid.

While we may, as stated above, precipitate the vanadium as vanadium pentoxide from this aqueous solution at any time, we prefer to acidify the solution progressively to have more or less a series of successive reactions and separations. As a result of the first acidification with sulfuric acid, the soluble compounds or complexes of alumina and silica are precipitated and removed by a second filtering. We may add to the filtrate a sufficient quantity of the sulfuric acid to precipitate the vanadium but we prefer to add only sufficient acid to convert the sodium chromate to sodium bichromate forming also sodium sulfate and to crystallize the sulfate from solution leaving the bichromate and the sodium vanadate dissolved in the liquor. The solution is evaporated to crystallize the sodium sulfate which is removed by centrifuging and filtering. When the gravity of the liquor reaches about 1.70, only about 0.5 per cent of sodium sulfate remains in the solution.

The acid concentration for vanadium precipitation is beyond that necessary to precipitate alumina, silica and to convert the chromate to bichromate. After the bichromate has been formed usually by addition of sulfuric acid, only a small amount of acid is necessary to bring the bichromate solution to the acidity required for vanadium precipitation. We may add any suitable acid such as hydrochloric, nitric, sulfuric or chromic acids, but since sulfuric acid is cheap and adds only to sulfates already in the solution, we prefer to add sulfuric acid. The amount of acid necessary to produce optimum acidity for the vanadium precipitation depends upon the concentration of sodium bichromate in the liquor and is, accordingly, somewhat variable depending upon the character of the solution acidified. As a guide or measure in determining a suitable degree of acidity, the liquor having a specific gravity of about 1.70 should have a pH of about 1.7, as measured on a glass electrode. A solution of this concentration and acidity may be diluted with water and the pH as given by a glass electrode will be approximately 3.0. The acidity determinations must accordingly take into consideration the effect upon the pH when it is measured by a glass electrode of the concentration of sodium bichromate in the liquor being tested.

After the liquor has been suitably acidified to convert the sodium vanadate into vanadium pentoxide, it is necessary to age the liquor in order to effect a coagulation of the vanadium pentoxide which appears to separate initially from the solution as a colloid. After the ageing which may vary from a few hours to several days depending upon the impurities, temperature and concentration, the liquor is filtered to recover the vanadium pentoxide. In this manner from 60 to 90 per cent of the vanadium is recovered from the solution. The vanadium oxide is washed in the filter press and then dried. The dried product is valuable in its existing form for ceramic and metallurgical purposes.

Where it is desirable, for example, to retain the bichromate in solution as in the production of "chrome liquor," the solution is acidified by the addition of sulfuric acid to a pH of 1.7 as measured on a glass electrode. This forms a sort of colloidal precipitate of the oxidic vanadium and after proper ageing for from one to two days the solution is filtered to remove the oxidic vanadium precipitate. The pH of the filtrate may be adjusted with alkali to that desired for "chrome liquor." The vanadium is not entirely removed, the amount retained in the solution depending upon the original concentration.

The bichromate-containing liquor from which the sodium sulfate has been removed, and either with or without acidification to precipitate vanadium as just described, may be evaporated to a specific gravity of about 1.95, and cooled to room temperature to crystallize the bichromate, enabling about 60 per cent of the bichromate to be removed from the solution. The crystals are preferably removed from the mother liquor by centrifuging, and while a small amount of vanadium is in the crystals, they are sufficiently pure for commercial use. They may be dried out and used "as-is" or redissolved to make low vanadium-containing chromate liquor. The unprecipitated vanadium is concentrated in the mother liquor from which the bichromate crystals were removed. If the vanadium has not previously been removed, the mother liquor is further acidified with sulfuric acid for the precipitation of the vanadium pentoxide. After the acidified solution has been aged and the oxidic vanadium precipitate removed by filtering, the filtrate is returned to the process, for example to the evaporators, to retain in the system any compounds not removed by crystallization and precipitation.

We claim:

1. In a method of producing alkali-metal chromate involving the production of an aqueous solution containing alkali-metal chromate and a soluble vanadate, the improvement which comprises acidifying the solution with sulfuric acid sufficiently to convert the chromate to bichromate without precipitating the vanadium and forming also sodium sulfate, evaporating the solution to crystallize sodium sulfate, the resulting solution having a pH of more than 1.7 as measured on a glass electrode, filtering out the sodium sulfate and further evaporating the filtrate to crystallize bichromate, cooling the concentrated filtrate and removing from the solution crystallized bichromate, adding to the mother liquor sufficient sulfuric acid to give a pH of around 1.7 as measured on a glass electrode to precipitate the vanadium as an oxidic compound, ageing the solution to effect a coagulation of the vanadium oxidic compound, removing the coagulated vanadium oxidic compound from the solution, and utilizing the solution from which the vanadium was removed as a source of sodium bichromate.

2. In a method of producing alkali-metal chromate involving the production of an aqueous solution containing alkali-metal chromate and a soluble vanadate, the improvement which comprises acidifying the solution with sulfuric acid sufficiently to convert a large part of the chromate to bichromate without precipitating the vanadium and forming also sodium sulfate, the resulting solution having a pH of more than 1.7 as measured on a glass electrode, evaporating the solution to crystallize sodium sulfate, filtering out the sodium sulfate and further evaporating the filtrate to crystallize bichromate, cooling the concentrated filtrate and removing from the solution crystallized bichromate, adding to the mother liquor sufficient sulfuric acid to increase the acidity of the solution to a point where there is an effective precipitation of the vanadium as an oxidic compound, the resulting solution having a pH of around 1.7 as measured on a glass electrode, ageing the solution to effect a coagulation of the oxidic compound, removing the oxidic compound from the solution as a commercially useful product, and utilizing the solution from which the vanadium was removed as a source of sodium bichromate.

3. In a method of producing alkali-metal chromate involving the production of an aqueous solution containing soluble compounds of alumina, silica, alkali-metal chromate and a soluble vanadate, the improvement which comprises acidifying the solution with sulfuric acid to precipitate compounds of alumina and silica contained in the solution, removing the precipitated compounds of alumina and silica, evaporating the solution to a specific gravity of about 1.7, adding more sulfuric acid to the solution to decrease the pH to about 1.7 as measured on a glass electrode to precipitate the vanadium as an oxidic compound, coagulating and removing from the solution the oxidic compound, and utilizing the remaining solution for the recovery of bichromate.

4. The method of producing alkali-metal chromates from chromite ore containing vanadium which comprises roasting the ore with soda ash in the presence of excess oxygen and in the absence of lime in amounts which will effectively prevent the solubilization of the vanadium and converting the chromium to sodium chromate and the vanadium to sodium vanadate, extracting with water the soluble compounds from the roasted material including alumina, silica, the vanadate and the sodium chromate, acidifying the resulting solution sufficiently to precipitate alumina and silica, removing the alumina and silica from the solution and further acidifying the solution to convert the vanadium to an insoluble oxidic compound, removing the insoluble oxidic vanadium from the solution, and utilizing the solution from which the vanadium was removed as a source of sodium bichromate.

5. The method of producing alkali-metal chromates from chromite ore containing vanadium which comprises roasting the ore with soda ash in the presence of excess oxygen and in the absence of lime in amounts which will effectively prevent the solubilization of the vanadium and converting the chromium to sodium chromate and the vanadium to sodium vanadate, extracting with water the soluble compounds from the roasted material including alumina, silica, the vanadate and the sodium chromate, acidifying the resulting solution sufficiently to precipitate alumina and silica, removing the alumina and silica and further acidifying the solution to convert the chromate to bichromate, evaporating the solution to crystallize sodium bichromate, removing the crystals of sodium bichromate from the solution, acidifying the remaining liquor to precipitate vanadium in oxidic form, removing the vanadium from the solution, and utilizing the solution from which the vanadium was removed as a source of sodium bichromate.

6. The method of producing alkali-metal chromates from chromite ore containing vanadium which comprises roasting the ore with soda ash in the presence of excess oxygen and in the absence of lime in amounts which will effectively prevent the solubilization of the vanadium and converting the chromium to sodium chromate and the vanadium to sodium vanadate, extracting with water the soluble compounds from the roasted material, acidifying the resulting solution sufficiently with sulfuric acid to precipitate alumina and silica, removing the alumina and silica from the solution, further acidifying the solution with sulfuric acid to convert a large part of the chromate to bichromate forming also sodium sulphate, removing the sodium sulphate from the solution, evaporating the solution and removing crystals of bichromate therefrom, adding more sulfuric acid to the solution to convert the vanadium to an insoluble oxidic compound, ageing the solution for a sufficient time to permit coalescing of the particles of oxidic compound, separating the oxidic compound from the solution, and utilizing the solution from which the vanadium was removed as a source of sodium bichromate.

7. The method of producing alkali-metal chromates from chromite ore containing vanadium which comprises roasting the ore with soda ash in the presence of excess oxygen and in the absence of lime in amounts which will effectively prevent the solubilization of the vanadium and converting the chromium to sodium chromate and the vanadium to sodium vanadate, extracting with water the soluble compounds from the roasted material, acidifying the resulting solution sufficiently with sulfuric acid to precipitate alumina and silica, removing the alumina and silica from the solution, further acidifying the solution to convert a large part of the chromate to bichromate forming also sodium sulphate, removing the sodium sulphate from the solution, concentrating the solution to a specific gravity of about 1.7, acidifying the concentrated solution by the addition of sulfuric acid until a pH of about 1.7 is obtained as measured on a glass electrode to precipitate a compound of vanadium, removing the precipitated vanadium compound from the solution and evaporating the solution to crystallize bichromate therefrom.

ALFRED E. VAN WIRT.
ANDREW G. AYLIES.